US010593262B2

(12) United States Patent
Zhang

(10) Patent No.: US 10,593,262 B2
(45) Date of Patent: Mar. 17, 2020

(54) COMPENSATION METHOD FOR MURA

(71) Applicant: Shenzhen China Star Optoelectronics Semiconductor Display Technology Co., Ltd., Shenzhen (CN)

(72) Inventor: Xianming Zhang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/321,827

(22) PCT Filed: Sep. 29, 2018

(86) PCT No.: PCT/CN2018/108572
§ 371 (c)(1),
(2) Date: Jan. 29, 2019

(65) Prior Publication Data

US 2020/0035152 A1 Jan. 30, 2020

(30) Foreign Application Priority Data

Jul. 30, 2018 (CN) .......................... 2018 1 0854442

(51) Int. Cl.
*G06F 1/00* (2006.01)
*G09G 3/3225* (2016.01)
*G09G 3/36* (2006.01)

(52) U.S. Cl.
CPC ......... *G09G 3/3225* (2013.01); *G09G 3/3607* (2013.01); *G09G 2320/0233* (2013.01); *G09G 2320/0626* (2013.01)

(58) Field of Classification Search
CPC ............ G09G 5/393; G09G 5/10; G09G 3/00; G09G 3/36; G09G 2320/0233
See application file for complete search history.

(56) References Cited

U.S. PATENT DOCUMENTS

2015/0269889 A1* 9/2015 Hsu ..................... G09G 3/3266 345/690

* cited by examiner

*Primary Examiner* — Michael A Faragalla
(74) *Attorney, Agent, or Firm* — Leong C. Lei

(57) ABSTRACT

The present disclosure relates to a Mura compensation method, including: obtaining a first image, obtaining an initial Mura compensation value M0 of each Mura pixel, determining whether the initial Mura compensation value M0 satisfies a relation $-N \leq M0 \leq N$, configuring the initial Mura compensation value as a target Mura compensation value, determining whether a maximum value M1 and a minimum value M2 satisfy a relation $M2>0$, $N<M1\leq 2N$ or a relation $M1<0$, $-2N\leq M2<-N$, selecting a first grayscale value and obtaining a first Mura compensation value $M_{s1}$ in response to $M2>0$, $N<M1\leq 2N$ or $M1<0$, $-2N\leq M2<-N$, controlling the first Mura compensation value $M_{s1}$ to satisfy a relation $-N\leq M_{S1}\leq N$, and configuring the first Mura compensation value $M_{s1}$ as the target Mura compensation value.

8 Claims, 2 Drawing Sheets

COMPENSATION METHOD FOR MURA

CROSS-REFERENCE TO RELATED APPLICATION

This application claims the priority of Chinese Patent Application No. 201810841303.4, entitled "ORGANIC LIGHT-EMITTING DIODE (OLED) DRIVING CIRCUIT AND ACTIVE-MATRIX ORGANIC LIGHT-EMITTING DIODE (AMOLED) DISPLAY PANEL", filed on Jul. 27, 2018, the disclosure of which is incorporated herein by reference in its entirety.

FIELD OF THE INVENTION

The present disclosure relates to display field, and more particularly to a compensation method for Mura.

BACKGROUND OF THE INVENTION

The flat display devices have been widely adopted due to the attributes, such as thin, low power-consuming, and no-radiation. The conventional flat display devices may include liquid crystal displays (LCDs) and organic light-emitting displays (OLEDs).

With the development of the technology and the demand by the human, the size of the flat display devices has become greater, the resolution of the display devices has become higher, and the demand for the manufacturing processes has become greater. The large-sized display panels, such as a thin film transistor (TFT)-LCD, may easily have a Mura problem (i.e., uneven brightness problem) due to the defects of the manufacturing processes. Conventionally, the Mura problem may be solved by improving the manufacturing processes. For the portion that cannot be solved by improving the manufacturing processes may be solved by a Demura technique, which is a compensation method for the uneven brightness.

Regarding to the display panels which have been manufactured, the physical properties are determined. The grayscale compensation method may be adopted to correct the brightness of the pixels, so as to compensate for the Mura effect resulting from the defects of the manufacturing processes. The grayscale compensation method is achieved by changing the grayscale value of the pixels to improve the uniformity of the brightness. The grayscale compensation method is to obtain the Mura status of the grayscale image captured by the camera, and the input image is a single grayscale picture (theoretically, the brightness of all pixel is the same), to increase the grayscale value of the darker region by a predetermined compensation value (to increase the brightness), to decrease the grayscale value of the brighter region by a predetermined compensation value (to decrease the brightness) according to the brightness of the central region. That is, the grayscale compensation value is decreased with respect to the brighter pixels, and the grayscale compensation value is increased with respect to the darker pixels. As such, each pixel may have a consistent brightness after conducting compensation method, and the Mura problem may be solved.

However, the conventional Demura technique has a compensational range "N". That is, for the Mura pixels, the maximum number of the grayscale compensation value, which may be increased or decreased, is "N" ("N" is a natural number). If the grayscale compensation value exceeds the compensational range, the compensation method may not be able to be conducted, which may cause the disqualification (NG) of the panels.

SUMMARY OF THE INVENTION

The present disclosure relates to a Mura compensation method capable of extending a Mura compensational range.

The present disclosure relates to the Mura compensation method, including the following steps.

In step 10, obtaining a first image of a display panel captured with a predetermined grayscale value "S0" by a camera; in step 20, obtaining an initial Mura compensation value "M0" of each Mura pixel on the display panel according to the first image basing on the predetermined grayscale value "S0"; in step 30, determining whether the initial Mura compensation value "M0" satisfies a relation: $-N \leq M0 \leq N$, wherein "N" indicates a predetermined grayscale compensational range, and "N" is a natural number; in step 40, configuring the initial Mura compensation value "M0" of each Mura pixel as a target Mura compensation value in response to $-N \leq M0 \leq N$, and conducting a Mura compensation process on each Mura pixel according to the target Mura compensation value; or performing step 50 in response to the relation: $-N \leq M0 \leq N$ being not satisfied; in step 50, determining whether a maximum value "M1" and a minimum value "M2" of the initial Mura compensation value "M0" of each Mura pixel satisfy a relation: $M2>0$, $N<M1 \leq 2N$, or a relation: $M1<0$, $-2N \leq M2<-N$; in step 60, selecting a first grayscale value "S1" and obtaining a first Mura compensation value "$M_{s1}$" according to the first grayscale value "S1" in response to $M2>0$, $N<M1 \leq 2N$, or $M1<0$, $-2N \leq M2<-N$, controlling the first Mura compensation value "$M_{s1}$" of all of the pixels to satisfy a relation: $-N \leq MS1 \leq N$, configuring the first Mura compensation value "$M_{s1}$" of all of the pixels as the target Mura compensation value, and conducting the Mura compensation process according to the target Mura compensation value.

The Mura compensation method further includes: in step 70, selecting a second grayscale value "S2", in response to $M1-M2 \leq 2N$, and $M1>N$ or $|M2|>N$, wherein $M1>0$ and $M2<0$, obtaining a second Mura compensation value $M_{s2}$ of all of the pixels according to the second grayscale value "S2", controlling the second Mura compensation value "$M_{s2}$" of all of the pixels to satisfy a relation: $-N \leq M_{s2} \leq N$, configuring the second Mura compensation value "$M_{s2}$" as the target compensation value, and conducting the Mura compensation process on all of the pixels according to the target Mura compensation value.

In step 60, configuring the first grayscale value "S1" to be: $S1=S0+N-M0$; in response to only one Mura pixel and the initial Mura compensation value "M0" satisfies a relation: $N<M0 \leq 2N$; wherein the initial Mura compensation value "M0" of the Mura pixel is equal to "M1" and "M2".

In step 70, configuring the second grayscale value "S2" to be: $S2=S0+N-M1$; in response to $M1-M2 \leq 2N$ and $M1>N$; wherein "M1" is the maximum value of the grayscale compensation value of each Mura pixel, "M2" is the minimum value of the grayscale compensation value of each Mura pixel, and $M1>0$ and $M2<0$.

The Mura compensation method further includes: in step 80, configuring the grayscale compensation value of the normal pixels and the Mura pixel to be "$-N$" and "N" respectively in response to only one Mura pixel and the initial Mura compensation value "M0" being greater than "2N".

The Mura compensation method further includes: in step 90, configuring the grayscale compensation value of the normal pixels and the Mura pixel to be "N" and "−N" respectively in response to only one Mura pixel, and the initial Mura compensation value "M0" being less than "−2N".

The display panel is a liquid crystal display (LCD) panel.

The display panel is an organic light-emitting diode (OLED) display panel.

In view of the above, the Mura compensation method is capable of extending the Mura compensational range.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

Figure 3:
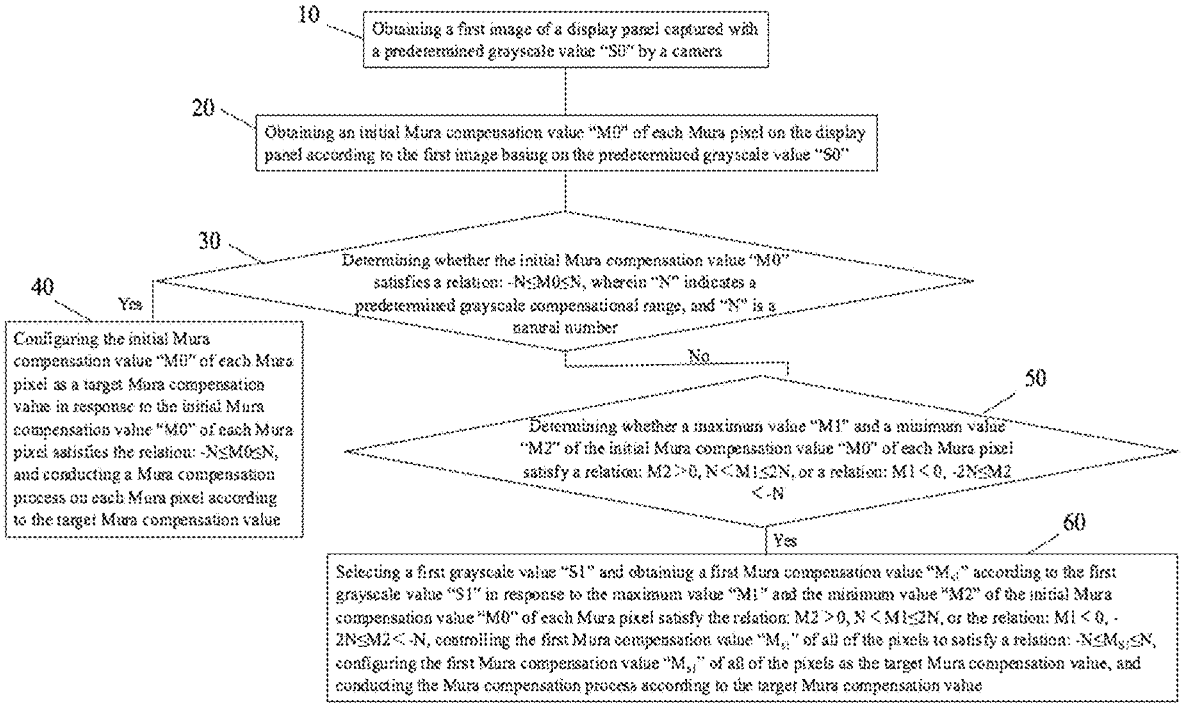
FIG. 3 is a flowchart illustrating the Mura compensation method in accordance with one embodiment of the present disclosure.

Referring to FIG. 3, in one aspect, the present disclosure relates to a Mura compensation method capable of improving the conventional Demura technique. The Mura compensation method of the present disclosure may not only compensate for Mura pixels, i.e., compensate for the brightness, but also compensate for normal pixels, which may be referred to as a substrate. The Mura compensation method is capable of adjusting a compensation value from two directions simultaneously. For example, if a compensational range of the Mura pixels is configured to be "N" number of grayscale value and the compensational range of the substrate is also configured to be "N" number of grayscale value, an overall compensational range may be increased to "2N" number of grayscale value. That is, the compensational range may be extended.

The Mura compensation method may include the following steps.

In step 10, obtaining a first image of a display panel captured with a predetermined grayscale value "S0" by a camera.

The display panel displays an image with a predetermined grayscale value "S0", and a Mura status may be obtained by the camera.

In step 20, obtaining an initial Mura compensation value "M0" of each Mura pixel on the display panel according to the first image basing on the predetermined grayscale value "S0".

Determining the normal pixels and the Mura pixels in the grayscale image, determining the Mura compensation value "M0" required for each Mura pixel according to the grayscale value "S0" of the normal pixels, applying a lower grayscale value to the Mura pixels having a higher display brightness, i.e., the Mura compensation value "M0" is negative, and applying a higher grayscale value to the Mura pixels having a lower display brightness, i.e., the Mura compensation value "M0" is positive. As such, each pixel may have a consistent brightness after conducting the Mura compensation method.

In step 30, determining whether the initial Mura compensation value "M0" satisfies a relation: $-N \le M0 \le N$, wherein "N" indicates a predetermined grayscale compensational range, and "N" is a natural number.

The Mura compensation method of the present disclosure is configured to extend the Mura compensational range. The predetermined compensational range is "N". The Mura pixels having higher brightness may be subtracted by "N" number of the grayscale value when compensating, and the Mura pixels having lower brightness may be increased by "N" number of the grayscale value when compensating. The initial Mura compensation value "M0" is configured to determine a brightness relation between the Mura pixels and the normal pixels. The initial Mura compensation value "M0" may be positive or negative integer. The positive initial Mura compensation value indicates the brightness of the Mura pixels is darker than that of the normal pixels. The negative initial Mura compensation value indicates the brightness of the Mura pixels is brighter than that of the normal pixels.

In step 40, configuring the initial Mura compensation value "M0" of each Mura pixel as a target Mura compensation value in response to the initial Mura compensation value "M0" of each Mura pixel satisfies the relation: $-N \le M0 \le N$, conducting a Mura compensation process on each Mura pixel according to the target Mura compensation value; or, performing step 50 in response to the initial compensation value "M0" of each pixel does not satisfy the relation: $-N \le M0 \le N$.

It is noted that the initial compensation value "M0" may be directly adopted to compensate for the Mura pixels in response to the compensated grayscale value is within the compensational range "N". As such, all of the Mura pixels may have the same brightness with the normal pixels, and each of the Mura pixels may be compensated by the initial Mura compensation value "M0".

In step 50, determining whether a maximum value "M1" and a minimum value "M2" of the initial Mura compensation value "M0" of each Mura pixel satisfy a relation: $M2>0$, $N<M1 \le 2N$, or a relation: $M1<0$, $-2N \le M2<-N$.

Step 50 is configured to compare the initial Mura compensation value "M0" of each Mura pixel with "N" and "2N" to determine whether all of the Mura pixels require to be increased or to be decreased by a predetermined Mura compensation value, and to determine whether the increased Mura compensation value and the decreased Mura compensation value are within a range from "N" to "2N".

In step 60, selecting a first grayscale value "S1" and obtaining a first Mura compensation value "$M_{s1}$" according to the first grayscale value "S1" in response to the maximum value "M1" and the minimum value "M2" of the initial Mura compensation value "M0" of each Mura pixel satisfy the relation: $M2>0$, $N<M1 \le 2N$, or the relation: $M1<0$, $-2N \le M2<-N$, controlling the first Mura compensation value "$M_{s1}$" of all of the pixels to satisfy a relation: $-N<M_{s1} \le N$, configuring the first Mura compensation value "$M_{s1}$" of all of the pixels as the target Mura compensation value, and conducting the Mura compensation process according to the target Mura compensation value.

When it is determined that all of the Mura pixels require to be increased or decreased by a predetermined Mura compensation value, and the increased Mura compensation value and the decreased Mura compensation value are within the range from "N" to "2N", the first grayscale value "S1", which is different from the predetermined grayscale value "S0" of the normal pixels, may be selected as a basis of the Mura compensation process. The first Mura compensation value "$M_{s1}$" may be obtained according to the first grayscale value "S1", and the first Mura compensation value "$M_{s1}$" of all of the pixels is controlled to satisfy a relation: $-N \leq M_{S1} \leq N$. The first Mura compensation value "$M_{s1}$" of all of the pixels is configured to be as the target Mura compensation value, and the Mura compensation process is conducted according to the target Mura compensation value. As such, the brightness of the normal pixels and the Mura pixels is compensated to the first grayscale value "S1", all of the pixels may have a consistent brightness, and the compensational range of the normal pixels and the Mura pixels are extended in two directions. It is noted that the first grayscale value "S1" may be arbitrarily selected as long as the first Mura compensation value "$M_{S1}$" of all the pixels satisfies the relation: $-N \leq M_{S1} \leq N$.

In step 60, configuring the first grayscale value "S1" to be: S1=S0+N−M0 in response to only one Mura pixel and the initial Mura compensation value "M0" satisfies a relation: $N < M0 \leq 2N$, wherein the initial Mura compensation value "M0" is equal to "M1" and "M2".

In one example, the Mura compensation method of the present disclosure may further include step 70.

In step 70, selecting a second grayscale value "S2", in response to $M1-M2 \leq 2N$, and $M1>N$ or $|M2|>N$, wherein "M1" and "M2" are the maximum value and the minimum value of the initial Mura compensation value of each Mura pixel respectively, and $M1>0$ and $M2<0$, obtaining a second Mura compensation value "$M_{s2}$" of all of the pixels according to the second grayscale value "S2", controlling the second Mura compensation value "$M_{s2}$" of all of the pixels to satisfy a relation: $-N \leq M_{s2} \leq N$, configuring the second Mura compensation value "$M_{s2}$" as the target compensation value, and conducting the Mura compensation process on all of the pixels according to the target Mura compensation value.

Step 70 is configured to determine whether the required compensation value of each pixel is increased or decreased, and to compare the Mura pixel with each other to determine whether the maximum value of the increased compensation value minus the decreased compensation value (negative value) is less than "2N" and each of the increased compensation value and the decreased compensation value is greater than "N". When the conditions are satisfied, the second grayscale value "S2", which is different from the predetermined grayscale value "S0" of the normal pixels, may be selected as the basis of the Mura compensation process. The second Mura compensation value "$M_{s2}$" may be obtained according to the second grayscale value "S2", and the second Mura compensation value "$M_{s2}$" of all of the pixels is controlled to satisfy a relation: $-N < M_{S2} \leq N$. The normal pixels and the Mura pixels are compensated to the second grayscale value "S2". As such, all of the pixels may have a consistent brightness, and the compensation range of the normal pixels and the Mura pixels are extended in two directions. It is noted that the second grayscale value "S2" may be arbitrarily selected as long as the second Mura compensation value "$M_{S2}$" of all the pixels satisfies the relation: $-N \leq M_{S2} \leq N$.

In step 70, configuring the second grayscale value "S2" to be: S2=S0+N−M1 in response to $M1-M2 \leq 2N$ and $M1>N$, i.e., at least one Mura pixel whose brightness is less than the normal pixels and a grayscale value difference between the normal pixels and the Mura pixel is greater than "N", wherein "M1" is the maximum value of the grayscale compensation value of each Mura pixel, "M2" is the minimum value of the grayscale compensation value of each Mura pixel, and $M1>0$ and $M2<0$. The brightness of the Mura pixel and the normal pixels are compensated to the same brightness of the second grayscale value "S2". That is, the grayscale value of the normal pixels requires to be decreased by (M1−N). As such, the compensational range may be extended.

In one example, the Mura compensation method of the present disclosure may further include step 80.

In step 80, configuring the grayscale compensation value of the normal pixels and the Mura pixel to be "−N" and "N" respectively in response to only one Mura pixel and the initial Mura compensation value "M0" being greater than "2N".

In another example, the Mura compensation method of the present disclosure may further include step 90.

In step 90, configuring the grayscale compensation value of the normal pixels and the Mura pixel to be "N" and "−N", respectively, in response to only one Mura pixel, and the initial Mura compensation value "M0" being less than "−2N". When the conditions of step 80 and step 90 are satisfied, the brightness of the Mura pixel is beyond the grayscale value range "2N" of the normal pixels. That is, the compensation value exceeds the range of "2N", and the Mura pixel may not able to be compensated. The proper way is to compensate for both of the normal pixels (the substrate) and the Mura pixel by "N" number of the grayscale value to reduce a brightness gap between the normal pixels and the Mura pixel.

In another aspect, the present disclosure further relates to a liquid crystal display (LCD) panel or an organic light-emitting diode (OLED) display panel capable of conducting the Mura compensation method.

Figure 1:
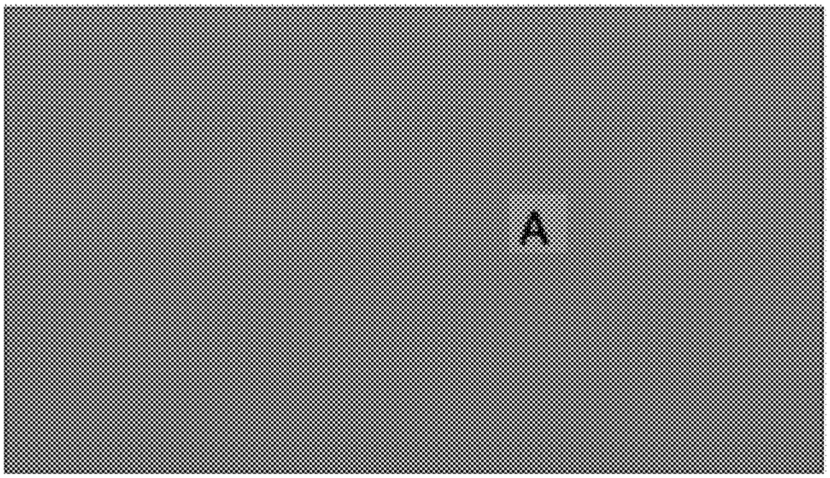
FIG. 1 is a diagram illustrating a panel before a Mura compensation method is conducted in accordance with one embodiment of the present disclosure.
Figure 2:
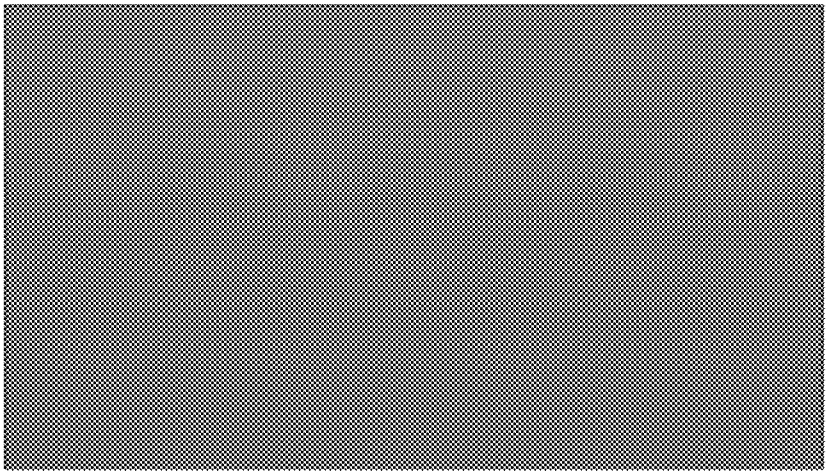
FIG. 2 is a diagram illustrating a panel after the Mura compensation method is conducted in accordance with one embodiment of the present disclosure.

Referring to FIG. 1 and FIG. 2, in one example, the display panel may only include one Mura pixel "A". The Mura compensation method may include the steps of obtaining the grayscale image of the LCD panel, determining the grayscale value required to be compensated for, compensating for the grayscale value of the Mura pixel "A" directly in response to the grayscale value "M", which is required to be compensated for, is within a range of "N". As such, the Mura pixel and the substrate (i.e., the normal pixels) may have a consistent brightness. If compensation value "M" is within the range from "N" to "2N", the normal pixels may be compensated by (M−N) number of the grayscale value, and the Mura pixel may be compensated by "N" number of the grayscale value. If the compensation value "M" exceeds "2N", the Mura compensation process may not able to be conducted completely, and the proper way is to compensate for both of the normal pixels and the Mura pixel by "N" number of grayscale value.

In view of the above, the Mura compensation method of the present disclosure is capable of extending the range of the Mura compensation value to twice.

Above are embodiments of the present invention, which does not limit the scope of the present invention. Any equivalent amendments within the spirit and principles of the embodiment described above should be covered by the protected scope of the invention.

What is claimed is:

1. A Mura compensation method, comprising:

in step 10, obtaining a first image of a display panel captured with a predetermined grayscale value "S0" by a camera;

in step 20, obtaining an initial Mura compensation value "M0" of each Mura pixel on the display panel according to the first image basing on the predetermined grayscale value "S0";

in step 30, determining whether the initial Mura compensation value "M0" satisfies a relation: $-N \le M0 \le N$, wherein "N" indicates a predetermined grayscale compensational range, and "N" is a natural number;

in step 40, configuring the initial Mura compensation value "M0" of each Mura pixel as a target Mura compensation value in response to $-N \le M0 \le N$, and conducting a Mura compensation process on each Mura pixel according to the target Mura compensation value; or performing step 50 in response to the relation: $-N \le M0 \le N$ being not satisfied;

in step 50, determining whether a maximum value "M1" and a minimum value "M2" of the initial Mura compensation value "M0" of each Mura pixel satisfy a relation: $M2>0$, $N<M1 \le 2N$, or a relation: $M1<0$, $-2N \le M2<-N$;

in step 60, selecting a first grayscale value "S1" and obtaining a first Mura compensation value "$M_{s1}$" according to the first grayscale value "S1" in response to $M2>0$, $N<M1 \le 2N$, or $M1<0$, $-2N \le M2<-N$, controlling the first Mura compensation value "$M_{s1}$" of all of the pixels to satisfy a relation: $-N \le M_{S1} \le N$, configuring the first Mura compensation value "$M_{s1}$" of all of the pixels as the target Mura compensation value, and conducting the Mura compensation process according to the target Mura compensation value.

2. The Mura compensation method according to claim 1, wherein the Mura compensation method further comprises:

in step 70, selecting a second grayscale value "S2", in response to $M1-M2 \le 2N$, and $M1>N$ or $|M2|>N$, wherein $M1>0$ and $M2<0$, obtaining a second Mura compensation value $M_{s2}$ of all of the pixels according to the second grayscale value "S2", controlling the second Mura compensation value "$M_{s2}$" of all of the pixels to satisfy a relation: $-N \le M_{S2}<N$, configuring the second Mura compensation value "$M_{s2}$" as the target compensation value, and conducting the Mura compensation process on all of the pixels according to the target Mura compensation value.

3. The Mura compensation method according to claim 1, wherein, in step 60, configuring the first grayscale value "S1" to be:

$$S1=S0+N-M0;$$

in response to only one Mura pixel and the initial Mura compensation value "M0" satisfies a relation: $N<M0 \le 2N$;

wherein the initial Mura compensation value "M0" of the Mura pixel is equal to "M1" and "M2".

4. The Mura compensation method according to claim 2, wherein, in step 70, configuring the second grayscale value "S2" to be:

$$S2=S0+N-M1;$$

in response to $M1-M2 \le 2N$ and $M1>N$;

wherein "M1" is the maximum value of the grayscale compensation value of each Mura pixel, "M2" is the minimum value of the grayscale compensation value of each Mura pixel, and $M1>0$ and $M2<0$.

5. The Mura compensation method according to claim 1, wherein the Mura compensation method further comprises:

in step 80, configuring the grayscale compensation value of the normal pixels and the Mura pixel to be "−N" and "N" respectively in response to only one Mura pixel and the initial Mura compensation value "M0" being greater than "2N".

6. The Mura compensation method according to claim 1, wherein the Mura compensation method further comprises:

in step 90, configuring the grayscale compensation value of the normal pixels and the Mura pixel to be "N" and "−N" respectively in response to only one Mura pixel, and the initial Mura compensation value "M0" being less than "−2N".

7. The Mura compensation method according to claim 1, wherein the display panel is a liquid crystal display (LCD) panel.

8. The Mura compensation method according to claim 1, wherein the display panel is an organic light-emitting diode (OLED) display panel.

* * * * *